US011917351B2

(12) United States Patent
Dominijanni et al.

(10) Patent No.: US 11,917,351 B2
(45) **Date of Patent: *Feb. 27, 2024**

(54) AUDIO DEVICE

(71) Applicant: Bose Corporation, Framingham, MA (US)

(72) Inventors: Andrew D. Dominijanni, Newton, MA (US); Nathan A. Jeffery, Boston, MA (US); David W. Beverly, Lunenburg, MA (US); Yang Liu, Sudbury, MA (US); Christopher A. Pare, Franklin, MA (US); Paul T. Bender, Framingham, MA (US); Eric M. Wallace, Andover, MA (US); George E. P. Chute, Milford, MA (US)

(73) Assignee: Bose Corporation, Framingham, MA (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/673,088

(22) Filed: Feb. 16, 2022

(65) Prior Publication Data

US 2022/0174388 A1 Jun. 2, 2022

Related U.S. Application Data

(63) Continuation of application No. 17/538,597, filed on Nov. 30, 2021, which is a continuation of application No. 16/875,160, filed on May 15, 2020, now Pat. No. 11,303,984, which is a continuation of application No. 15/901,076, filed on Feb. 21, 2018, now Pat. No. 10,674,244.

(51) Int. Cl.
*H04M 1/19* (2006.01)
*H04R 1/10* (2006.01)

(52) U.S. Cl.
CPC ........... *H04R 1/1008* (2013.01); *H04R 1/105* (2013.01); *H04R 1/1075* (2013.01)

(58) Field of Classification Search
CPC . A45F 5/00; A61F 11/08; H04M 1/19; H04M 1/6066; H04R 1/1008; H04R 1/1033; H04R 1/105; H04R 1/1058; H04R 1/1016; H04R 1/1075; H04R 1/326; H04R 25/656; H04R 1/1041; H04R 1/1066; H04R 5/02; A61B 5/121; H01Q 9/42
See application file for complete search history.

(56) References Cited

U.S. PATENT DOCUMENTS

| | | | | |
|---|---|---|---|---|
| 7,648,005 | B2 * | 1/2010 | Leong | A61F 11/08 381/381 |
| 8,218,799 | B2 * | 7/2012 | Murphy | H04R 1/1016 381/381 |
| 10,516,928 | B2 * | 12/2019 | Briggs | H01Q 9/42 |

(Continued)

*Primary Examiner* — Gerald Gauthier

(57) ABSTRACT

An audio device with a body configured to be worn on or abutting an outer ear of a user, wherein the body is configured to contact at least one of the outer ear and the portion of the head that abuts the outer ear, at two separate spaced contact locations, and wherein the body is compliant at a body portion that defines one of the contact locations. The device also has an acoustic module carried by the body and configured to locate a sound-emitting opening anteriorly of and proximate the user's ear canal opening when the body is worn on or abutting the ear of the user.

10 Claims, 9 Drawing Sheets

(56) References Cited

U.S. PATENT DOCUMENTS

| | | | | |
|---|---|---|---|---|
| 10,674,244 | B2 * | 6/2020 | Dominijanni | H04R 1/105 |
| 11,303,984 | B2 * | 4/2022 | Dominijanni | H04R 1/105 |
| 2003/0152244 | A1 * | 8/2003 | Dobras | H04R 1/1058 381/381 |
| 2004/0170294 | A1 * | 9/2004 | Murozaki | H04R 1/105 381/381 |
| 2005/0078847 | A1 * | 4/2005 | Dobras | H04R 1/1058 381/381 |
| 2005/0157899 | A1 * | 7/2005 | Raviv | H04R 1/1008 381/322 |
| 2007/0258613 | A1 * | 11/2007 | Wright | H04R 5/02 381/370 |
| 2008/0132292 | A1 * | 6/2008 | Hansen | H04R 1/326 455/569.1 |
| 2009/0052702 | A1 * | 2/2009 | Murphy | H04R 1/1016 381/380 |
| 2009/0123000 | A1 * | 5/2009 | Wright | H04R 5/02 381/381 |
| 2009/0202098 | A1 * | 8/2009 | Chan | H04R 1/1066 381/380 |
| 2010/0202643 | A1 * | 8/2010 | Nielsen | H04R 25/656 381/328 |
| 2012/0140976 | A1 * | 6/2012 | Birger | H04M 1/6066 381/381 |
| 2013/0142376 | A1 * | 6/2013 | Lin | H04R 1/1008 381/373 |
| 2013/0216087 | A1 * | 8/2013 | MacDonald | H04R 1/105 381/381 |
| 2014/0254842 | A1 * | 9/2014 | Smith | A61B 5/121 381/317 |
| 2014/0334661 | A1 * | 11/2014 | Besgen, Sr. | H04R 1/1066 381/388 |
| 2016/0360307 | A1 * | 12/2016 | Willis | H04R 1/1008 |
| 2017/0099537 | A1 * | 4/2017 | Ushakov | H04R 1/1016 |
| 2017/0105062 | A1 * | 4/2017 | Lamb | H04R 1/1033 |
| 2017/0311067 | A1 * | 10/2017 | Willis | H04R 1/105 |
| 2018/0077478 | A1 * | 3/2018 | Willis | A45F 5/00 |
| 2018/0288518 | A1 * | 10/2018 | Schmidt | H04R 1/1066 |
| 2019/0261077 | A1 * | 8/2019 | Dominijanni | H04R 1/105 |
| 2020/0267464 | A1 * | 8/2020 | Graff | H04R 1/1008 |
| 2022/0174388 | A1 * | 6/2022 | Dominijanni | H04R 1/1008 |
| 2023/0308801 | A1 * | 9/2023 | Schmidt | H04R 1/1041 381/309 |

* cited by examiner

AUDIO DEVICE

CROSS-REFERENCE TO RELATED APPLICATIONS

This application is a continuation of and claims priority of application Ser. No. 17/538,597 filed Nov. 30, 2021, which is a continuation of application Ser. No. 16/875,160 filed on May 15, 2020, which itself is a continuation of application Ser. No. 15/901,076 filed on Feb. 21, 2018. The complete disclosures of the aforementioned applications are incorporated herein by reference.

BACKGROUND

This disclosure relates to an audio device that is worn on the ear.

Wireless headsets deliver sound to the ear. Most wireless headsets include an earbud that is placed into the ear canal opening. Ear buds can inhibit or prevent the user from hearing the speech of others and environmental sounds. Also, earbuds send a social cue that the user is unavailable for interactions with others.

SUMMARY

All examples and features mentioned below can be combined in any technically possible way.

In one aspect, an audio device includes a body configured to be worn on or abutting an outer ear of a user, wherein the body is configured to contact at least one of the outer ear and the portion of the head that abuts the outer ear, at two separate spaced contact locations, and wherein the body is compliant at a body portion that defines one of the contact locations. An acoustic module carried by the body is configured to locate a sound-emitting opening anteriorly of and proximate the user's ear canal opening when the body is worn on or abutting the ear of the user.

Embodiments may include one of the following features, or any combination thereof. The sound-emitting opening can be located anteriorly of and proximate the tragus of the ear. The sound-emitting opening may be pointed at the tragus. One or both of the two separate spaced contact locations may be defined by a compliant cushion member that is configured to contact the ear root proximate the upper portion of the helix. The two separate spaced contact locations may be substantially diametrically opposed. One contact location may be proximate the otobasion inferius.

Embodiments may include one of the above and/or below features, or any combination thereof. The body may be configured to contact at least one of the outer ear and the portion of the head that abuts the outer ear, at three separate spaced contact locations. The first and second contact locations may be proximate the upper portion of the outer ear helix. A third contact location may be proximate the otobasion inferius. The third contact location may be in an ear root dimple located just posteriorly of the otobasion inferius. The body may be compliant at the body portions that define each of the three contact locations.

Embodiments may include one of the above and/or below features, or any combination thereof. The body may be configured to contact the ear root region at a plurality of separate spaced contact locations. A first contact location may be proximate the upper portion of the helix of the outer ear, and a second contact location may be adjacent to the otobasion inferius. The body may be compliant at both body portions that define both the first and second contact locations. A third contact location may be proximate the first contact location, such that the first and third contact locations are configured to contact the ear root region on opposite sides of the ear root ridge proximate the upper portion of the helix. The first and third contact locations may be defined by a compliant cushion member that is configured to contact the ear root region proximate the upper portion of the helix. The second contact location may be defined by a cushion member that comprises an arc-shaped surface that is configured to contact the ear root region. The body may further comprise a compliant spring member that extends from the cushion member and is configured to contact the ear root region or outer ear proximate the otobasion inferius.

Embodiments may include one of the above and/or below features, or any combination thereof. The body may extend generally along an arc that extends for at least 180 degrees. The body may be configured to contact the ear root region at a plurality of locations along the ear root from proximate the otobasion superius to proximate the otobasion inferius. The body may have an out of plane curvature along its extent. The out of plane curvature may be constructed and arranged such that the body portion proximate the otobasion inferius is laterally offset from the body portion proximate the otobasion superius.

In another aspect, an audio device includes a body configured to be worn on or abutting an outer ear of a user, and an acoustic module carried by the body and configured to locate a sound-emitting opening anteriorly and proximate the tragus of the user's ear when the body is worn on or abutting the ear of the user. The body is configured to contact the ear root region at a plurality of separate contact locations, wherein a first contact location is proximate the upper portion of the helix of the outer ear, and a second contact location is adjacent to and posterior of the otobasion inferius, wherein the body is compliant at portions that define the first and second contact locations, and wherein a third contact location is proximate the first contact location, such that the first and third contact locations are configured to contact the ear root region on opposite sides of the ear root ridge proximate the upper portion of the helix.

In another aspect, an audio device includes a compliant body configured to be worn on or abutting an outer ear of a user, and an acoustic module carried by the body and configured to locate a sound-emitting opening anteriorly and proximate the tragus of the user's ear when the body is worn on or abutting the ear of the user. The body extends generally along an arc that extends for at least 180 degrees, wherein the body is configured to contact the ear root region at a plurality of locations along the ear root region, from proximate the otobasion superius to proximate the otobasion inferius, wherein the body has an out of plane curvature along its extent that is constructed and arranged such that the body portion proximate the otobasion inferius is laterally offset from the body portion proximate the otobasion superius.

DETAILED DESCRIPTION

An audio device, such as a wireless headset, that delivers sound close to an ear canal opening but does not block or obstruct the ear canal. The audio device is carried by the ear using a structure that has compliance such that it lightly clamps on the ear. The device is able to remain in place even as the user moves the head.

Figure 1:
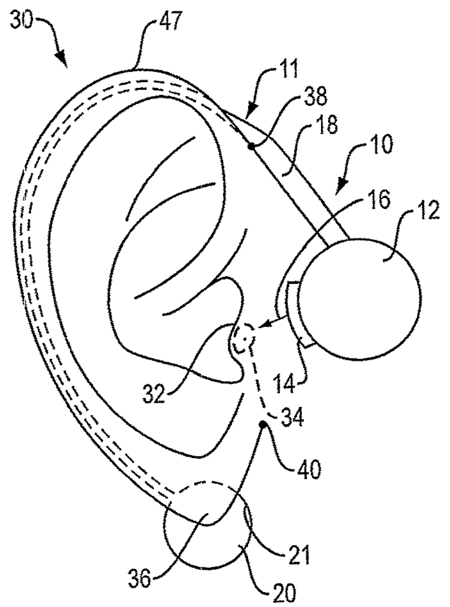
FIG. 1 is side view of an acoustic device mounted to the right ear of a user.

Exemplary audio device 10 is depicted in FIG. 1. Audio device 10 is carried by outer ear 30. Audio device 10 comprises acoustic module 12 that is configured to locate sound-emitting opening 14 anteriorly of and proximate to the ear canal opening 34, which is behind (i.e., generally underneath) ear tragus 32. The general axis or direction of sound emission from opening 14 is indicated by arrow 16. Audio device 10 further includes body 11 that is configured to be worn on or abutting outer ear 30 such that body 11 contacts the outer ear and/or the portion of the head that abuts the outer ear, at two or more separate, spaced contact locations. Body 11 has some compliance, so that it gently grips the outer ear and/or the ear root region when it is worn. The compliance can be but need not be at one or more of the body portions that define one or more of the contact locations.

Body 11 can be shaped generally to follow the ear root, which is the intersection of the outer ear and the head. Contact along the ear root or the outer ear and/or the head abutting the ear root (collectively termed the ear root region) can be at two, three, or more, spaced locations along the ear root. However, since the human head has many shapes and sizes, body 11 does not necessarily contact the ear root. Rather, it can be designed to have a shape and a compliance such that it will, at least on most heads, contact the outer ear and/or the portion of the head that abuts the outer ear. This contact occurs at least at two spaced locations. These locations can be substantially or generally diametrically opposed. The compliance can cause a slight compressive force at the opposed locations and so can lead to a grip on the ear that is sufficient to help retain the device in place on the ear as the head is moved. In one non-limiting example, two of the contact locations are proximate the upper portion of the outer ear helix, and a third contact location is proximate the lower part of the ear or abutting head, such as at or near the otobasion inferius. In one non-limiting example, the third contact location is in or proximate the ear root dimple that is located in most heads very close to or abutting or just posterior of the otobasion inferius. The audio device body may be compliant at the body portions that define each of three (or more) expected contact locations.

Some of the separate spaced contact locations may be defined by a compliant cushion member. The compliant cushion member can be configured to contact the ear root region proximate the upper portion of the helix. A first contact location can be proximate the upper portion of the helix of the outer ear, and a second contact location can be adjacent to and posterior of the otobasion inferius. The body can be but need not be compliant at both body portions that define both the first and second contact locations. A third contact location may be proximate the first contact location, such that the first and third contact locations are configured to contact the ear root region on opposite sides of the ear root ridge proximate the upper portion of the helix. Two contact locations may be defined by a compliant cushion member that is configured to contact the ear root region proximate the upper portion of the helix. A different contact location may be defined by a cushion member that comprises an arc-shaped surface that is configured to contact the ear root region at or near the ear root dimple. The body may further comprise a compliant spring member that extends from the cushion member and is configured to contact the ear root region or outer ear proximate the otobasion inferius.

The audio device body may extend generally along an arc that extends for at least 180 degrees. The body may be configured to contact the ear root region at a plurality of locations along the ear root from proximate the otobasion superius to proximate the otobasion inferius, wherein the body has an out of plane curvature along this extent. The out of plane curvature may be constructed and arranged such that the body portion proximate the otobasion inferius is laterally offset from the body portion proximate the otobasion superius.

Audio device body 11 can generally follow the shape of the ear root, as is further explained below. Body 11 in this example includes generally "C"-shaped portion 18 that extends from an upper end where it is coupled to acoustic module 12, to a lower end where it is coupled to lowest member 20. Some or all of portion 18 can be compliant. Compliance can be accomplished in one or more know mechanical manners. Examples include the choice of materials (e.g., using compliant materials such as elastomers or spring steel or the like) and/or a construction to achieve compliance (e.g., including compliant joints in the construction). Generally, but not necessarily, body 11 follows the ear root from the otobasion superius 38 (which is at the upper end of the ear root) to close to or including the otobasion inferius 40 (which is at the lower end of the ear root). Lower terminal portion or member 20 can be constructed and arranged to fit into or near the dimple or depression that is found in most people behind earlobe 36 and just posterior of the otobasion inferius. Also, or alternatively, member 20 can be generally round and so can have an upper arc-shaped surface 21 that provides for an ear root region contact location along the arc, thus accommodating different head and ear sizes and shapes. If member 20 is made from or includes a compliant material (or is made compliant in another manner), it can provide some grip to the head/ear. Portion 18 at or around the ear root region proximate the upper portion 47 of the outer ear helix (which is generally the highest point of the outer ear) can also have compliance. Since ear portion 47 is generally diametrically opposed to device portion 20 (and the ear root dimple), device compliance at one or more points proximate these two locations will provide a gripping force that will tend to hold audio device 10 on the head/ear even as the head is moved, as is further explained below.

Since the device-to-ear/head contact points are both in the vicinity of the ear root proximate upper ear portion 47 and in the vicinity of the ear root dimple, the contact points are generally diametrically opposed. The opposed compliances create a resultant force on the device (the sum of contact force vectors, not accounting for gravity) that lies about in the line between the opposed contact regions. In this way, the device can be considered stable on the ear even in the absence of high contact friction (which adds to stabilization forces and so only helps to keep the device in place). Contrast this to a situation where the lower contact region is substantially further up on the back of the ear. This would cause a resultant force on the device that tended to push and rotate it up and off the ear. By arranging the contact forces roughly diametrically opposed on the ear, and by creating points of contact on either side of or over an area of the upper ear root ridge, the device can accommodate a wider range of orientations and inertial conditions where the forces can balance, and the device can thus remain on the ear.

Figure 2:
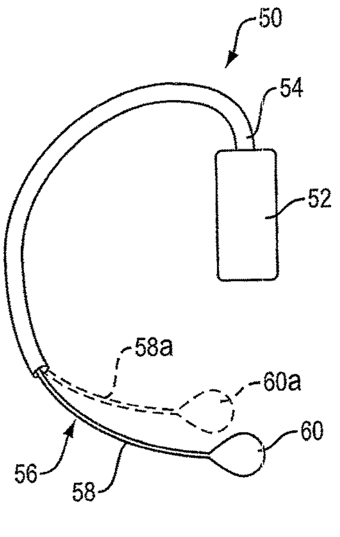
FIG. 2 is a side view of another acoustic device.
Figure 3:
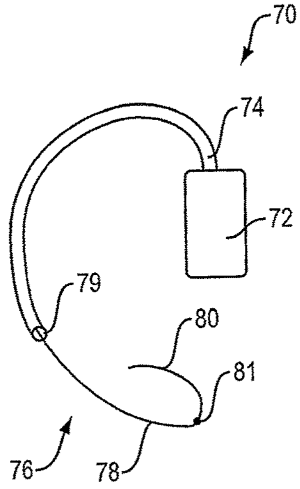
FIG. 3 is a side view of another acoustic device.

FIGS. 2 and 3 illustrate two of many variations that can provide the desired compliance. In FIG. 2, audio device 50 includes a body 54 that is configured to be worn on or abutting an outer ear of a user, wherein the body is configured to contact at least one of the outer ear and the portion of the head that abuts the outer ear, at two separate spaced contact locations. Body 54 is preferably compliant at a body portion that defines one or more of the contact locations. Acoustic module 52 is carried by body 54 and is configured to locate a sound-emitting opening anteriorly of and proximate the user's ear canal opening when the body is worn on or abutting the ear of the user. Compliance can be accomplished at least in part by spring-member 56 at the lower end of body 54. Member 56 can include or comprise a cantilever spring 58. Terminal member 60 can be the same as or similar to member 20, FIG. 1. Locations 58*a* and 60*a* shown in phantom are the rest location. When worn, spring 58 is pushed outward by the outer ear such that it rests on or near the ear root, typically with member 60 located in or near the ear root dimple. The extension of the spring results in a force directed up against the ear root, generally toward the upper part of the audio device body.

Audio device 70, FIG. 3, includes a body 74 that is configured to be worn on or abutting an outer ear of a user, wherein the body is configured to contact at least one of the outer ear and the portion of the head that abuts the outer ear, at two separate spaced contact locations. Body 74 is preferably compliant at a body portion that defines one or more of the contact locations. Acoustic module 72 is carried by body 74 and is configured to locate a sound-emitting opening anteriorly of and proximate the user's ear canal opening when the body is worn on or abutting the ear of the user. Compliance can be accomplished at least in part by lower portion 76 at the lower end of body 74. Portion 76 comprises members 78 and 80 that are coupled together by rotating joint 81. Portion 78 is coupled to body 74 by rotating joint 79. Either or both of joints 79 and 81 can include a restoring force that tends to restore them to their unflexed resting positions. The joints thus provide compliance that results in a force directed up against the ear root, generally toward the upper part of the audio device body.

Figure 4B:
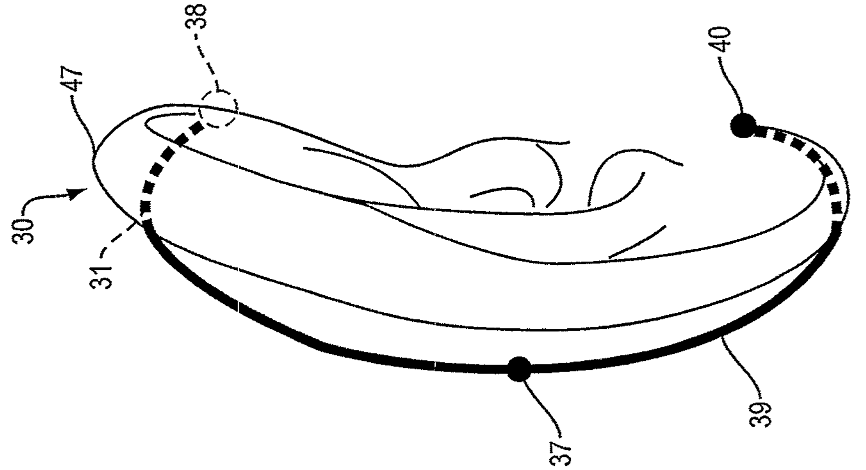
FIG. 4B is a rear perspective view of the ear of FIG. 4A.
Figure 4A:
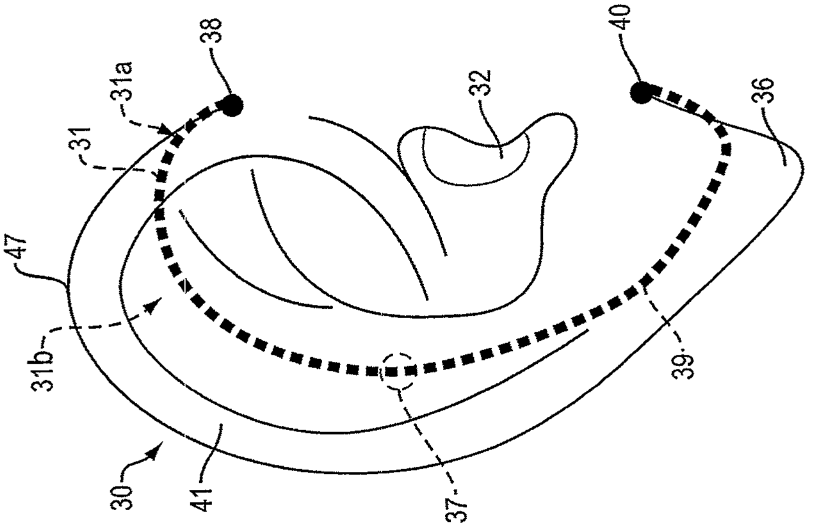
FIG. 4A is an enlarged side view of a representative ear.
Figure 4C:
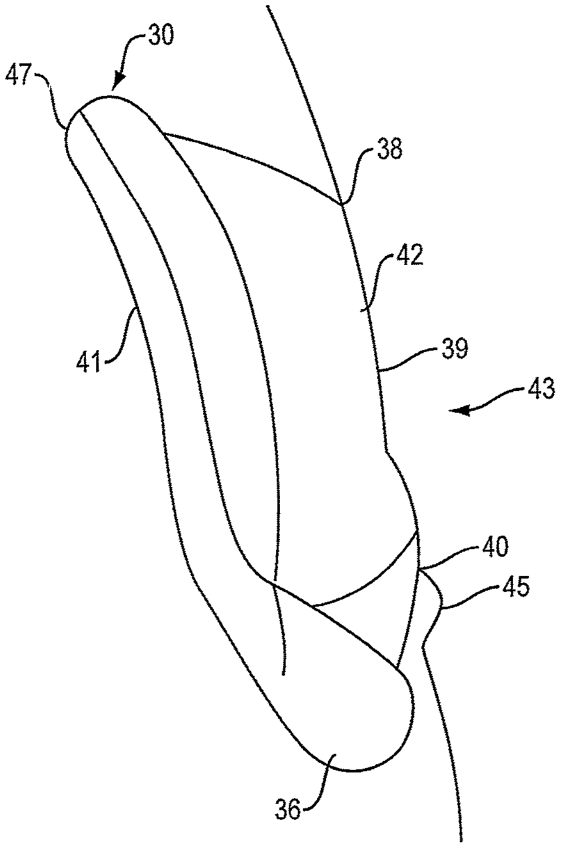
FIG. 4C is a rear view of the ear of FIGS. 4A and 4B.

FIGS. 4A-4C illustrate aspects of the outer ear and adjacent part of the head that are useful in understanding the audio device of this disclosure. Outer ear 30 includes helix 41, tragus 32, and earlobe 36. Ear root 39 is the location where the outer ear 30 meets the head 43. Ear root 39 has an upper end 38 termed the otobasion superius, and a lower end 40 termed the otobasion inferius. The most posterior part 37 of the ear root is termed the otobasion posterius. The ear root typically exhibits an arch 31 between area 31*a* close to otobasion superius 38 and area 31*b* where the ear root begins its descent toward otobasion posterius 37. The outer ear comprises portion 42 that abuts the ear root. The head comprises portion 43 that abuts the ear root. Also, the head typically includes an ear root dimple (depression) 45 (FIG. 4C) adjacent to the otobasion inferius and the earlobe; dimple 45 is typically but not necessarily located in most heads very close to or abutting or just posterior of the otobasion inferius 40, as shown in FIG. 4C.

Figure 5A:
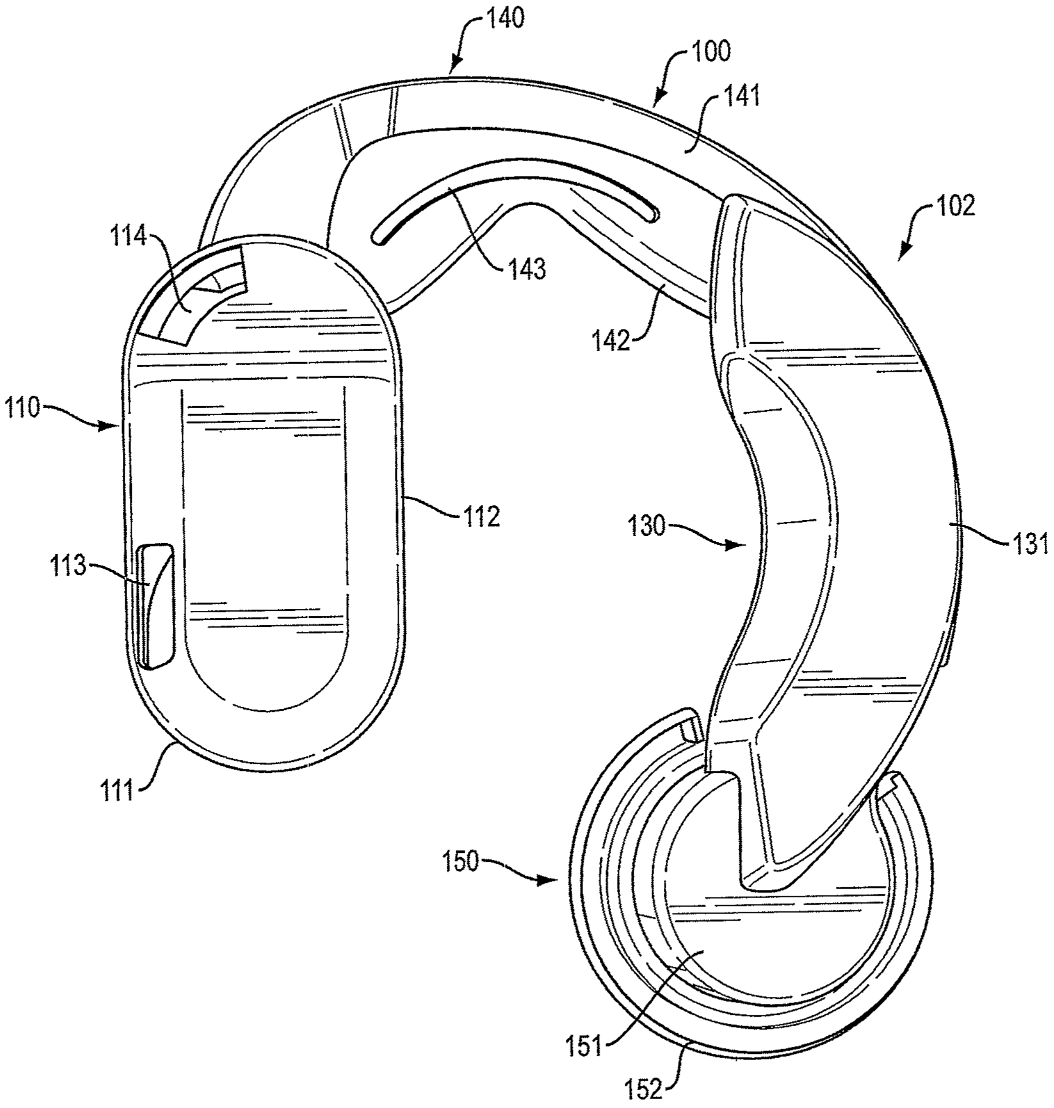
FIGS. 5A and 5B are side and perspective views, respectively, of an acoustic device.
Figure 5B:
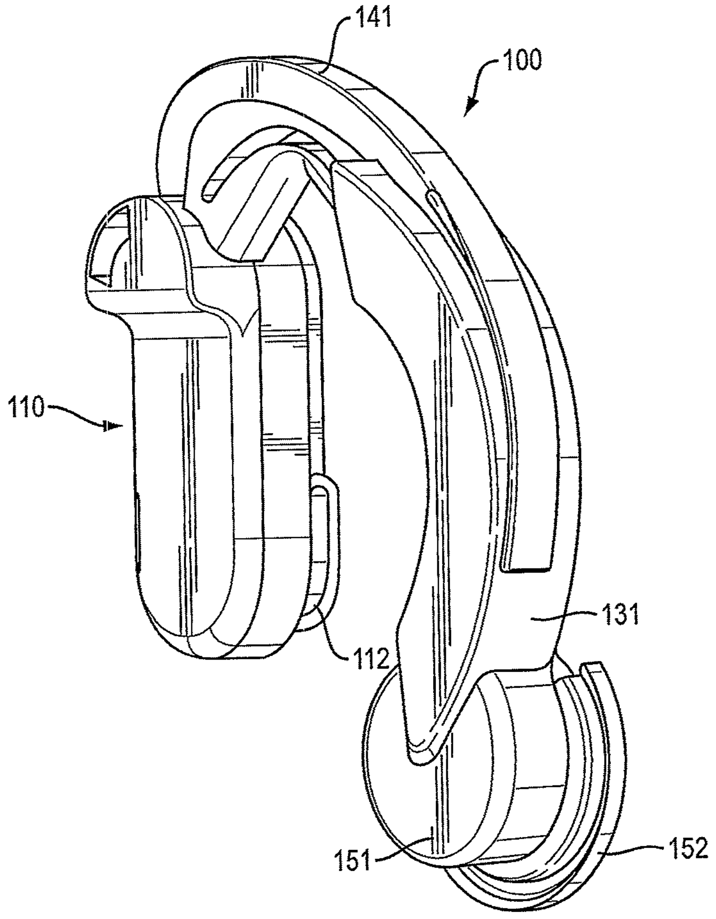

Audio device 100, FIGS. 5A and 5B, is designed to be carried by the left ear (not shown). FIG. 5A shows the side that would face away from the head when the device was worn on the ear. FIG. 5B is a perspective view. Device 100 includes acoustic module 110 comprising housing 111 that includes a sound-emitting outlet or nozzle 112 that faces the tragus and is meant to lie very close to or against the skin. Nozzle 112 is an opening in housing 111 that typically is arranged to deliver sound from one side (typically but not necessarily the front side) of one or more audio drivers that are located within housing 111. In one non-limiting example, acoustic module 110 accomplishes a variable-length dipole loudspeaker, as disclosed in U.S. patent application Ser. No. 15/375,119, filed Dec. 11, 2016, the disclosure of which is incorporated herein by reference in its entirety. In this example, there is a resistive opening or port 113, and a mass opening or port 114, both of which are exposed to the rear-side of the driver and are part of the variable length dipole. In some examples there may also be a second opening in the front cavity (not shown) that is opposite nozzle 112 that helps to reduce intermodulation in the acoustic cavity, as disclosed in U.S. patent application Ser. No. 15/647,749, filed Jul. 12, 2017, the disclosure of which is incorporated herein by reference in its entirety.

Acoustic module 110 is carried by device body 102 that comprises portion 140 that is closest to acoustic module 110, middle portion 130 that is connected to portion 140, and end (lower) portion 150 that is connected to portion 130. In this non-limiting example, portions 140 and 150 exhibit compliance. Since these portions are located generally at diametrically-opposed locations of the ear, the compliance can provide opposed compressive forces that help to hold device 100 on the ear. Compliance in portion 140 is provided (at least in part) by generally inverted "V"-shaped member 142 that may include elongated cavity or opening 143 that gives it greater compressive range. Member 142 can be made of a compliant material such as an elastomer or a foam (covered or uncovered). Member 142 can be soft, durable, and have good durability to skin oil and UV. In one non-limiting example member 142 is made from an elastomer such as a silicone, a polyurethane, an acrylic polymer, or a fluoroelastomer, and may have a Shore A durometer in the 10-50 range. The concave shape of member 142 allows it to sit on or adjacent to the ear root region on both sides of ear root arch 31 (see FIG. 4A). Member 142 will thus make contact at both area 31*a* and 31*b*, FIG. 4A. Portion 130 comprises housing 131 that can carry the electronics and power that are used to receive wireless audio signals (using any now-known or future-developed wireless technology, such as Bluetooth) and create and send signals that are used to drive the driver(s) located in acoustic module 110. Portion 130 is thus typically but not necessarily relatively rigid.

Portion 150 comprises generally cylindrical central member 151 and generally annular outer member 152. Member 152 can be made from a material with some compliance, such as an elastomer of the type described above. Member 151 will sit on or near the ear root dimple, and member 152 will contact the outer ear and/or the ear root region near the dimple. Both members 142 and 152 should have enough compliance to be compressed when device 100 is placed on the ear. The width of these elements (in the direction of compression) also helps the device to fit ears of different sizes and shapes. The compression of members 142 and 152 will cause forces against the ear (near the top and bottom of the ear) that are generally diametrically opposed; this helps to maintain the device on the ear. Also, the materials from which members 142 and 152 are made exhibit static friction with the skin that adds to the forces that help to keep the device in place on the ear.

Device 100 can be made mostly or entirely of an engineering plastic or a metal. Portion 140 can be made from a material specifically designed to be somewhat flexible, e.g. a high strength plastic or metal. Member 142 is intended to be a cushion and as described above can be made from an elastomer or a foam. Portions of any lower spring (e.g., portions 174 or 172 in FIG. 6) will contain spring elements, likely spring steel or Nitinol, or potentially be elastomeric in nature, as in member 152.

Figure 6A:
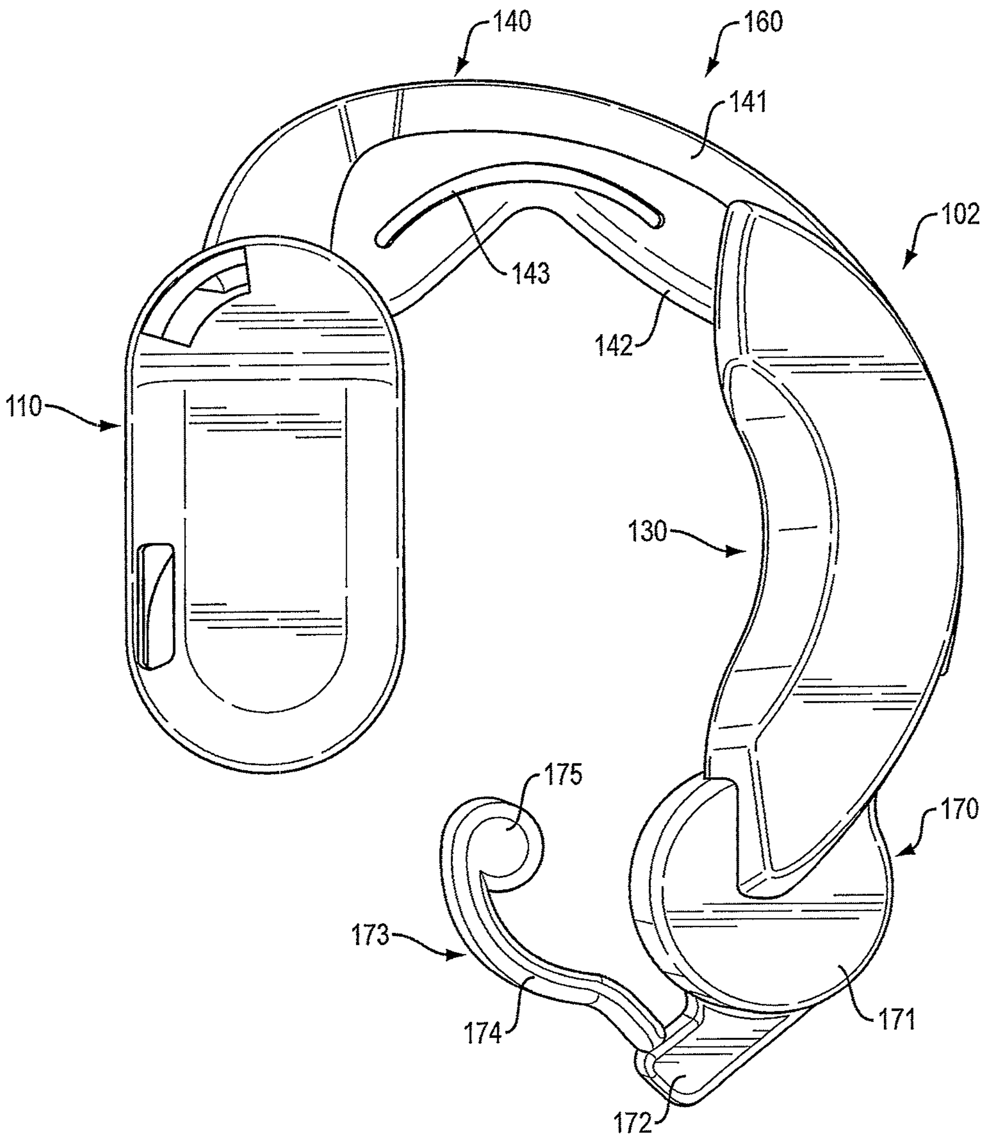
FIGS. 6A, 6B and 6C are side, perspective, and top views, respectively, of an acoustic device.
Figure 6B:
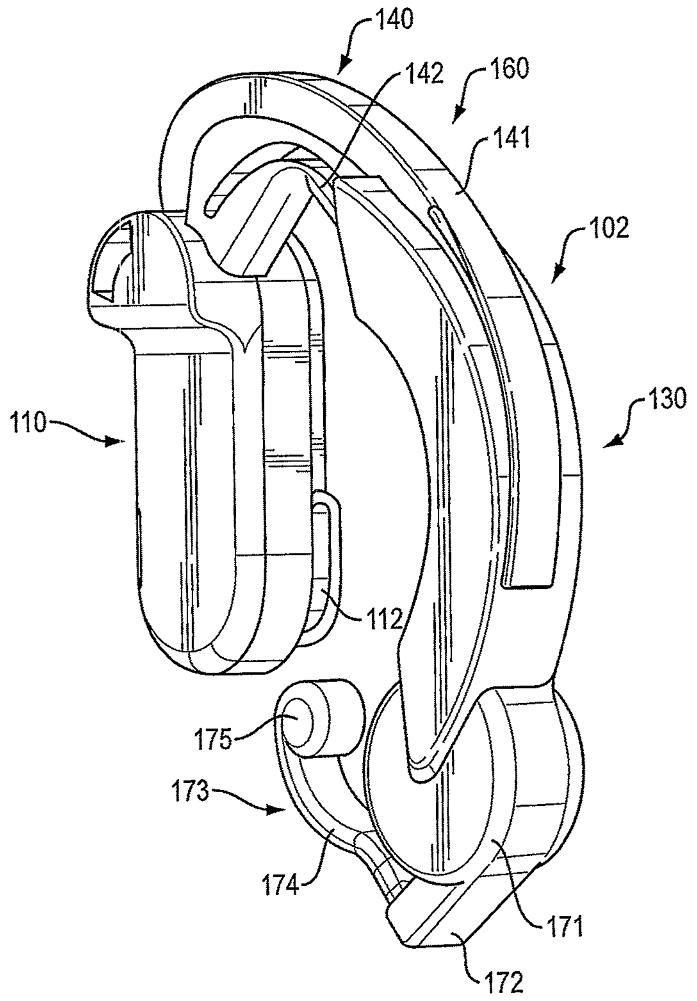
Figure 6C:
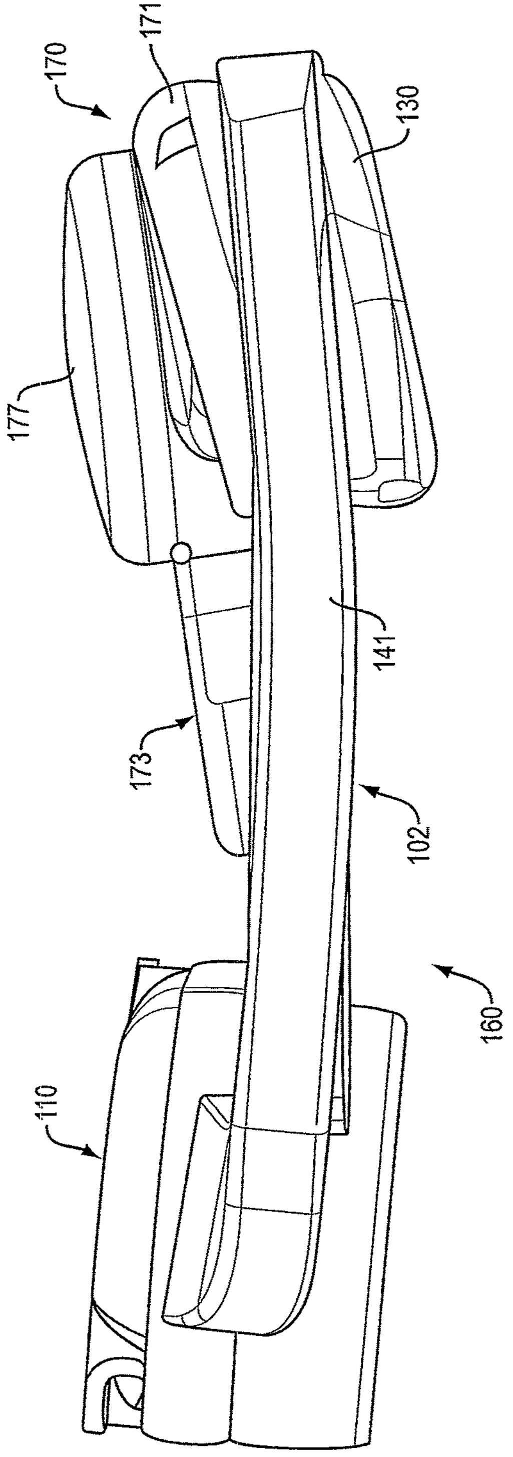
Figure 7:
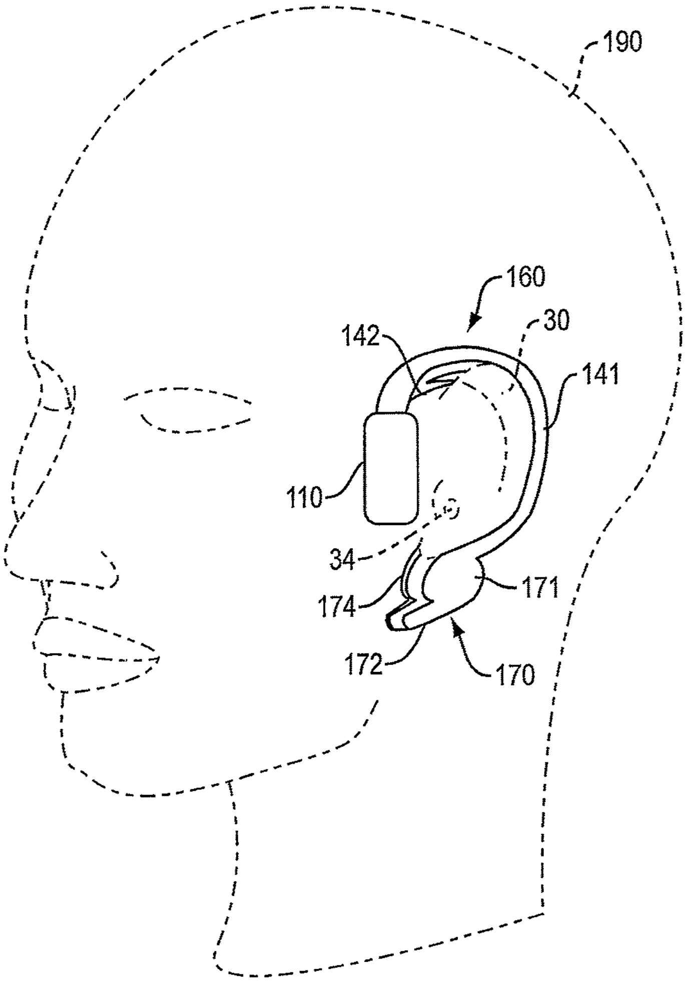
FIG. 7 illustrates the acoustic device of FIGS. 6A, 6B, and 6C mounted on the left ear.

Audio device 160, FIGS. 6A, 6B and 6C, differs from acoustic device 100 in part in its lower terminal portion 170. Generally cylindrical member 171 is similar to member 151, but can include inner portion 177 (FIG. 6C) that is compliant (e.g., made from a soft elastomer as described above), and designed to contact the ear root dimple. Portion 170 achieves its compliance at least in part by using spring member 173. Spring member 173 includes elongated cantilever spring 174 and terminal generally cylindrical member 175. Spring elements can be made from spring steel or Nitinol, for example, or potentially be elastomeric. Member 175 has an arc-shaped outer surface that is able to ride along the outer ear, or the ear root region, or the head near the ear root, as device 160 is placed over the ear as it is donned. The donning action typically involves the user placing member 142 down on the top of the ear root upper ridge (e.g., ridge 31, FIG. 4A). The user then rotates the device (clockwise in FIG. 6A) until member 171 sits in the ear root dimple. The arc-shaped surface of member 175 helps member 175 to slide along the ear as the device is donned. Since spring 174 is compressed when the device is worn, it creates a force opposing the forces created by member 142. FIG. 7 shows device 160 worn on ear 30. Spring 174 is bent (compressed) as described above, such that it is closer to member 171 than it is in the rest position shown in FIG. 6A. Acoustic module 110 is located directly in front of ear canal opening 34.

FIG. 6C illustrates another feature of acoustic device 160. As shown in FIG. 6A, body 102 extends generally along an arc that extends for at least 180 degrees. The body is configured to contact the region of the ear and head at or abutting the ear root, at a plurality of locations along the ear root region, from proximate the otobasion superius to proximate the otobasion inferius. In the present example, body 102 has an out of plane curvature along its extent. The out of plane curvature may be constructed and arranged such that the body portion proximate the otobasion inferius is laterally offset from the body portion proximate the otobasion superius. Thus, portion 110 will sit against the head just in front of the ear. Spine or member 141 can be non-planar, such that its end at housing 130 is laterally offset from its end at housing 110. This causes the device shape to generally follow the ear root of most people, and places member 177 at a lateral offset where it will fit into the ear root dimple of most people. Stated another way, in most people the ear root is not located in a plane. Rather, the lower end of the ear root (at the otobasion inferius) is closer to the median plane (i.e., the mid-sagittal plane) than is the upper end of the ear root (at the otobasion superius). When the audio device has a similar non-planar shape, it is better suited to fit into the ear dimple root and thus is better able to hold the acoustic nozzle just in front of the tragus, even as the user moves the head during normal activities or during exercise.

A number of implementations have been described. Nevertheless, it will be understood that additional modifications may be made without departing from the scope of the inventive concepts described herein, and, accordingly, other embodiments are within the scope of the following claims.

What is claimed is:

1. An audio device, comprising:
an acoustic module configured to deliver sound close to an ear canal opening but does not block or obstruct the ear canal,
wherein the audio device is carried by an ear using a structure that has compliance such that it lightly clamps on the ear,
wherein the structure comprises a body comprising: a first portion that exhibits compliance and a second portion that is connected to the first portion and is configured to sit posterior to an outer ear, wherein the first portion couples the acoustic module to the second portion.

2. The audio device of claim 1, wherein the first portion is formed of an elastomer.

3. The audio device of claim 2, wherein the elastomer has a Shore A durometer in the 10-50 range.

4. The audio device of claim 1, wherein the first portion has a concave shape.

5. The audio device of claim 1, wherein the second portion comprises a housing that carries a power source.

6. The audio device of claim 1, wherein the second portion is rigid.

7. The audio device of claim 1, wherein the second portion comprises a generally cylindrical central member.

8. The audio device of claim 7, wherein the second portion further comprises an annular outer member disposed adjacent the generally cylindrical central member and formed of a compliant material.

9. The audio device of claim 8, wherein the annular outer member is configured to contact the outer ear and/or an ear root region near an ear root dimple.

10. An audio device, comprising:
an acoustic module configured to deliver sound close to an ear canal opening but does not block or obstruct the ear canal,
wherein the audio device is carried by an ear using a structure that has compliance such that it lightly clamps on the ear,
wherein the acoustic module accomplishes a dipole loudspeaker,
wherein the acoustic module comprises a housing that houses an audio driver, the housing including a sound-emitting nozzle that is arranged to deliver sound from the one side of the audio driver and one or more ports exposed to a rear-side of the acoustic driver.

* * * * *